(12) United States Patent
Avakian

(10) Patent No.: US 9,493,610 B2
(45) Date of Patent: Nov. 15, 2016

(54) LOW MOLECULAR WEIGHT POLYPHENYLENE ETHER PREPARED WITHOUT SOLVENTS

(71) Applicant: PolyOne Corporation, Avon Lake, OH (US)

(72) Inventor: Roger W. Avakian, Solon, OH (US)

(73) Assignee: PolyOne Corporation, Avon Lake, OH (US)

(*) Notice: Subject to any disclaimer, the term of this patent is extended or adjusted under 35 U.S.C. 154(b) by 0 days.

(21) Appl. No.: 14/895,245

(22) PCT Filed: Jun. 3, 2014

(86) PCT No.: PCT/US2014/040654
§ 371 (c)(1),
(2) Date: Dec. 2, 2015

(87) PCT Pub. No.: WO2014/197458
PCT Pub. Date: Dec. 11, 2014

(65) Prior Publication Data
US 2016/0102174 A1    Apr. 14, 2016

Related U.S. Application Data

(60) Provisional application No. 61/830,204, filed on Jun. 3, 2013.

(51) Int. Cl.
| | |
|---|---|
| *C08G 59/62* | (2006.01) |
| *C08G 65/48* | (2006.01) |
| *C08G 65/38* | (2006.01) |
| *C08G 65/44* | (2006.01) |
| *C08G 65/46* | (2006.01) |
| *C08L 71/12* | (2006.01) |
| *B29C 47/00* | (2006.01) |
| *C08G 65/40* | (2006.01) |
| *B29K 23/00* | (2006.01) |
| *B29L 31/00* | (2006.01) |

(52) U.S. Cl.
CPC ........... *C08G 65/48* (2013.01); *B29C 47/0004* (2013.01); *B29C 47/0011* (2013.01); *C08G 65/38* (2013.01); *C08G 65/44* (2013.01); *C08G 65/46* (2013.01); *C08G 65/485* (2013.01); *C08L 71/126* (2013.01); *B29K 2023/0675* (2013.01); *B29L 2031/772* (2013.01)

(58) Field of Classification Search
CPC .................... C08G 65/48; B29C 47/0004
USPC ............................. 528/88, 110, 205
See application file for complete search history.

(56) References Cited

U.S. PATENT DOCUMENTS

| | | |
|---|---|---|
| 4,626,585 A | 12/1986 | Bartmann et al. |
| 4,743,661 A | 5/1988 | Mitulla et al. |
| 5,037,897 A | 8/1991 | Glans et al. |
| 5,081,185 A | 1/1992 | Haaf et al. |
| 5,741,846 A | 4/1998 | Lohmeijer et al. |
| 5,880,221 A | 3/1999 | Liska et al. |
| 6,414,084 B1 | 7/2002 | Adedeji |
| 6,429,277 B1 | 8/2002 | Braat et al. |
| 6,455,663 B1 | 9/2002 | Braat et al. |
| 6,576,700 B2 | 6/2003 | Patel |
| 6,809,159 B2 | 10/2004 | Adedeji |
| 6,878,781 B2 | 4/2005 | Zarnoch et al. |
| 6,900,257 B2 | 5/2005 | Chowdhury et al. |
| 7,858,726 B2 | 12/2010 | Onizuka et al. |
| 2003/0045757 A1 | 3/2003 | Ishii et al. |
| 2008/0246186 A1 | 10/2008 | Fisher et al. |
| 2009/0018303 A1* | 1/2009 | Onizuka ............. C08G 59/621 528/88 |
| 2010/0119716 A1 | 5/2010 | Chapman Irwin et al. |
| 2010/0218982 A1 | 9/2010 | Fujiwara et al. |

FOREIGN PATENT DOCUMENTS

EP    0 272 439 B1    1/1992

OTHER PUBLICATIONS van Aert et al.: "Modified Poly(2,6-dimethyl-1,4-phenylene ether)s Prepared by Redistribution," Macromolecules, vol. 30, No. 20, 1997, pp. 6056-6066, American Chemical Society.
SABIC Innovative Plastics Company: "PPO* Resin 630," Copyright 1997-2011.

* cited by examiner

Primary Examiner — Terressa Boykin
(74) Attorney, Agent, or Firm — John H. Hornickel

(57) ABSTRACT

Low molecular weight polyphenylene ether (PPE) is made from higher molecular weight PPE without using solvents by extruding the higher molecular weight PPE with a phenolic modifier and a redistribution catalyst. The low molecular weight PPE has a Mw/Mn polydispersity greater than about 2 and a Mn ranging from about 10,000 to about 20,000.

20 Claims, No Drawings

LOW MOLECULAR WEIGHT POLYPHENYLENE ETHER PREPARED WITHOUT SOLVENTS

CLAIM OF PRIORITY

This application claims priority from U.S. Provisional Patent Application Ser. No. 61/830,204 filed on Jun. 3, 2013, which is incorporated by reference.

FIELD OF THE INVENTION

This invention concerns the preparation of polyphenylene ether without the use of solvents.

BACKGROUND OF THE INVENTION

Polyphenylene ether (PPE) is a thermoplastic, linear, non-crystalline polyether made by the oxidative condensation of 2,6-dimethylphenol in the presence of a copper-amine-complex catalyst.

PPE, also called polyphenylene oxide, is known by those skilled in the art for its high heat resistance and for its flame retardance as a char former, with a Limiting Oxygen Index by ASTM. D 2863 of ~29%, which means PPE is not flammable under normal atmospheric conditions. Typically the glass transition of PPE ranges from ~210° C. to ~215° C. depending on its molecular weight.

Commercial PPE is well known, preferably in the form of a miscible blend of PPE and polystyrene, marketed as Noryl® resin from Sabic Innovative Plastics.

In addition to the use of PPE as a primary resin, PPE can also be used as an additive for epoxy resins to improve toughness and as an additive to styrenic copolymers to increase heat distortion temperature. In these additive applications, it is often desirable to have and use a lower molecular weight PPE ($M_n$ ~10,000-20,000 g/mole) or in some instances even lower. Such PPE materials are commercially available from Sabic but are considerably more expensive than the conventional molecular weight PPE ($M_n$ ~34,000-53,000 g/mole) because they are generally prepared from such conventional molecular weight PPE and then subjected to molecular weight reduction methods. Moreover, these commercially available low molecular weight PPE resins are prepared using a solvent-based process. Unfortunately, no matter how well the production occurs, there is always the possibility of residual amounts of solvent remaining in the resulting low molecular weight PPE resin.

SUMMARY OF THE INVENTION

What the art needs is a process for making low molecular weight PPE resin from commercial, conventional higher molecular weight PPE resin in a solvent-less, environmentally preferred, process that also melt devolatilizes the starting PPE using a conventional polymer melt-mixing extruder.

The present invention achieves a solvent-less reduction of molecular weight of PPE resin by the use of a phenolic modifier and a redistribution catalyst.

One aspect of the present invention is a method of reducing number average molecular weight of a high molecular weight polyphenylene ether polymer from a number average molecular weight of from about 34,000 to about 53,000 grams/mole to a number average molecular weight of from about 10,000 to about 20,000, comprising the steps of: (a) introducing the high polymer weight polyphenylene ether polymer, a phenolic modifier, and a redistribution catalyst into the throat of a polymer melt-mixing extruder and (b) propelling the high molecular weight polyphenylene ether polymer, the phenolic modifier, and redistribution catalyst at a sufficient temperature to melt the high molecular weight polymer and for a sufficient duration in the extruder to permit the phenolic modifier to break the high molecular weight polyphenylene ether polymer into a low molecular weight polyphenylene ether having a number average molecular weight of from about 10,000 to about 20,000 grams/mole, wherein no solvent is present in step (a) or step (b), and wherein the low molecular weight polyphenylene ether has a polydispersity (Mw/Mn) of greater than about 2.

Other features of the invention will be explained below.

EMBODIMENTS OF THE INVENTION

Polyphenylene Ether

The IUPAC name for PPE is Poly(2,6-dimethyl-1,4-phenylenether), having CAS No. 8031-18-3. Any commercially available PPE is a candidate for use in this invention. Bluestar New Chemical Materials Co. Ltd, located in Ruicheng County, Shanxi Province, China and Sabic Innovative Plastics LLC located in several countries worldwide are two known commercial sources for PPE. Presently acceptable grades of PPE are Blue Star's LXR040, LXR045, LXR050, LXR040C, LXR045C, LXR050C, with the first listed being preferred.

Phenolic Modifier

The agent which breaks the higher molecular weight PPE into low molecular weight PPE is a chemical containing phenolic moieties. Any commercially available phenolic is a candidate to be used to reduce the molecular weight of the PPE in a solvent-less process.

Non-limiting examples of chemicals containing phenolic moieties include bisphenol A (CAS No. 80-05-7 available from Sunoco, Dow Chemical, and Bayer AG); sterically (semi)-hindered phenols such as Pentaerythritol Tetrakis(3-(3,5-di-tert-butyl-4-hydroxyphenyl)propionate) sold as Irganox™ 1010 (CAS No. 6683-19-8 available from BASF); other phenolics as are described in Paragraphs [0018]-[0026] of U.S. Patent Application Publication 20100119716 (Chapman et al.), summarized here and incorporated by reference.

The polyhydric phenolic compound (or "phenol compound" in context) can comprise two to four hydroxy-phenyl groups attached to a C1-C16 hydrocarbyl moiety. In one embodiment, the polyhydric phenolic compound is a bisphenol having the formula

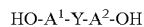

HO-A$^1$-Y-A$^2$-OH wherein A$^1$ and A$^2$ are independently a monocyclic divalent C$_6$-C$_{16}$ aromatic radical, and Y is a single bond or a C$_1$-C$_{16}$ bridging radical in which one or two atoms separate A$^1$ from A$^2$. The O-A$^1$ and A$^2$-O bonds are usually in the meta or para positions of A$^1$ and A$^2$ in relation to Y.

In one embodiment, the A$^1$ and A$^2$ are unsubstituted phenylene or substituted phenylene wherein substituents are C$_1$-C$_4$ hydrocarbyl groups (for example, alkyl), nitro, alkoxy, and the like. Specifically, A$^1$ and A$^2$ can be unsubstituted phenylene radicals. Each of A$^1$ and A$^2$ can, for example, be o-phenylene and/or m-phenylene, specifically both p-phenylene.

The Y group can, for example, be a hydrocarbon radical and specifically a saturated radical such as methylene, cyclohexylmethylene, ethylene, isopropylidene, neopentylidene, cyclohexylidene or cyclopentadecylidene, especially a gem-alkylene (alkylidene) radical and most specifically isopropylidene. Also included, however, are radicals that contain atoms other than carbon and hydrogen; for example, oxy or thio. Specifically, the polyhydric phenolic compound can be bisphenol A in which $A^1$ and $A^2$ are each p-phenylene and Y is isopropylidene.

Also, it is contemplated that functional phenolics can be used as described in US Patent Application Publication 20020042494 (Braat et al.) incorporated by reference and reproduced here:

A) phenolic compounds with formula

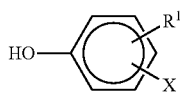

wherein $R^1$ represents a hydrogen-atom or an alkyl group and X represents an allyl group, an amino group, a protected amino group (e.g., protected by a tertiary-butyl carbonate), a carboxyl group, a hydroxy group, an ester group or a thiol group, wherein $R^1$ is an alkyl group when X represents an hydroxy group or an ester group wherein X may be separated from the phenol ring through an alkyl group and wherein the total number of carbon atoms in the alkyl groups attached to the phenol ring is not more than six; X can also be an ether or vinyl group.

B) bisphenol compounds with formula

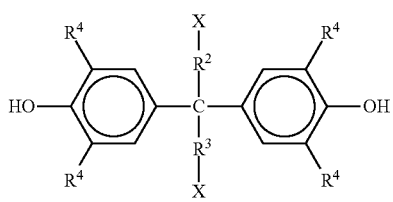

wherein each X, independently of the other X represents a hydrogen atom, an allyl group, an amino group, a protected amino group (e.g., protected by a tertiary-butyl carbonate), a carboxyl group, a hydroxy group, an ester group or a thiol group, with the proviso that not more than one X group represents a hydrogen atom, $R^2$ and $R^3$ represent an hydrogen atom or an alkyl group with 1-6 carbon atoms and each $R^4$ represents independently of the other $R^4$ a hydrogen atom, a methyl group or an ethyl group; R1, R2, R3, R4 can also be independently ether or vinyl.

C) a phenolic compound with at least one of the formulas:

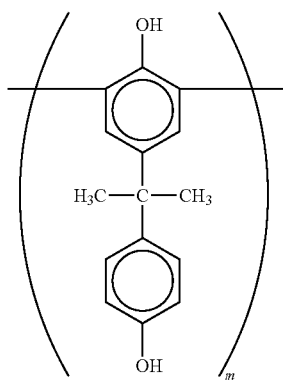 or

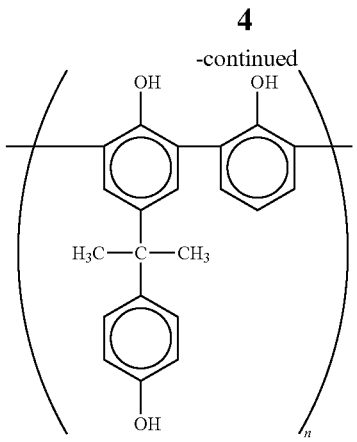

wherein m and n have values from 2-20;

D) phenolic compounds with formula

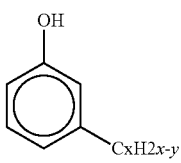

wherein x has a value of 12-20 and y has a value of 1-7 or a derivative thereof; D can also be a monophenol with two such groups attached to the ring;

E) multifunctional phenolic compounds with formula

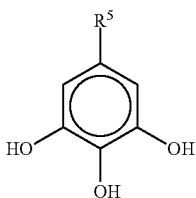

wherein $R^5$ represents a hydrogen atom, an alkyl group, an allyl group, an amino group, a protected amino group (e.g., protected by a tert-butyl carbonate), a carboxyl group, a hydroxy group, an ester group or a thiol group; or F) phenolic compounds with amino groups with formula

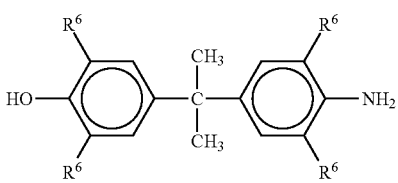

wherein $R^6$ represents independently of one another a hydrogen atom, an alkyl group or a methylene phenol group.

The reaction of any phenolic modifier with PPE results in a modified end group or end groups of the PPE, according to the type of phenolic modifier chosen.

Redistribution Catalyst

Redistribution catalysts are used to lower the number average molecular weight of the PPE. Non-limiting examples of such catalysts are free radical initiators; stable free radical materials; and diphenoquinones.

Mechanistically, the reaction between the polyhydric phenolic compound and the PPE is initiated by a free radical such as an aryloxy radical. This aryloxy radical attacks the phenolic end-group of the PPE polymer, producing a cyclohexadienyl quinone radical which redistributes to split out 2,6-dimethyl phenol. This process with additional aryloxy radicals continuous to reduce the molecular weight. It is also plausible that some dimerization of the cyclohexadienyl quinone radical can also be occurring which would result in some higher molecular weight PPE being formed concurrently; this is most likely the explanation for the broadening of the molecular weight distribution. However even with these competing processes, the overall result is to reduce the molecular weight of PPE.

Any conventional free radical initiator is a candidate for use as a redistribution catalyst in this invention. Non-limiting examples of free radical initiators to be used as redistribution catalysts include dicumyl peroxide (CAS No. 000080-43-3) commercially available either in crystalline form or on an inert carrier from a number of companies such as Akzo Nobel, Arkema and United-Initiators GmbH; and di(2-ethylhexyl) peroxydicarbonate (CAS No. 78-63-7 commercially available as Trigonox™ 101 from Akzo Nobel).

Preparation of Low Molecular Weight Polyphenylene Ether

Any conventional polymer melt-mixing extruder can be used to prepare the low molecular weight PPE from the higher molecular weight PPE. Rather than using the melt-mix extrusion process to increase molecular weight of a polymer through reactions with other ingredients, the extruder is used to break polymer chains, also known as chain scission, to lower the number average molecular weight (Mn) of the PPE. No solvent is needed for this chain scission change to the PPE. Without solvent being required or present, the resulting PPE does not contain any residual solvent or other undesired byproduct of the chain scission.

The screw diameter of the extruder can range from about 11 to about 60 and preferably from about 25 to about 53 mm. The number of melt-mixing temperature zones can range from about 6 to about 28 and preferably from about 9 to about 20. The temperature of the heating zones of the extruder can range from about 250° C. to about 350° C. and preferably from about 300° C. to about 325° C. The length/diameter (L/D) ratio of the extruder can range from about 25 to about 60 and preferably from about 40 to about 60. The speed in revolutions per minute of the extruder can range from about 50 to about 600 and preferably from about 250 to about 350.

It is also contemplated that downstream equipment such as side feeders for glass or other fillers or side-mounted extruders can be used to add additional components such as fibers/filler or polymers respectively once the number average molecular weight reduction reaction has been completed.

The PPE, the phenolic modifier, and the redistribution catalyst can be added individually at the throat of the extruder or pre-mixed using a Henschel mixer before addition at the throat. Pre-mixing is preferred because a homogenous mixture is needed for the chemical reactions to occur consistently and in the correct manner.

The amount in weight percent of phenolic modifier can range from about 0.025% to about 10% and preferably from about 0.07 to about 1.5%.

The amount in weight percent of redistribution catalyst can range from about 0.12% to about 2% and preferably from about 0.5% to about 1.1%.

The remainder after phenolic modifier and redistribution catalyst is PPE to be reduced in number average molecular weight. The mixture can comprise, consist essentially, or consist of these three ingredients, so long as no solvent is used.

With free radical initiation, the phenolic modifier is converted to an aryloxy radical which begins the reaction sequence previously described.

After traversing the melt-mixing zones, the low molecular weight PPE emerges from the die and is pelletized for later use. If the resulting PPE is too brittle to strand in a conventional waterbath, then underwater pelletization or use of a metal cooling belt followed by conventional pelletization can be used.

Usefulness of the Invention

The low molecular weight PPE made by the solvent-less process of this invention can be used in any of the manners that currently use low molecular weight PPE made by a solvent-borne process. Without limitation, low molecular weight PPE can be used as an additive for epoxy resins to improve toughness and as an additive to styrenic copolymers to increase heat distortion temperature.

Examples further explain the invention.

EXAMPLES

Examples 1-3 and Comparative Examples A-E

Both the Examples and Comparative Examples used the ingredients of Table 1.

TABLE 1

| Ingredient Name | Other Info. (CAS No.) |
|---|---|
| LXR040C Polyphenylene Ether (PPE) Base Polymer (Bluestar) | 24938-76-8 |
| Di-Cup ® Dicumyl Peroxide (DCP) Redistribution Catalyst (Arkema) | 80-43-3 |
| Bis Phenol A (BPA) (Acros) | 80-05-7 |

Comparative Example A, Comparative Example B, and Examples 1-3 and Comparative Examples C-E All molecular weights were determined by using gel permeation chromatography (GPC) at 25° C. with chloroform as a solvent and polystyrene as reference, according to ASTM D-5296-05.

Comparative Example A was tested for molecular weight without any extrusion or other change to the PPE as purchased.

Comparative Examples B-E and Examples 1-3 were extruded in a Prism Twin Screw Extrusion 16 mm twin screw extruder (L/D 40) with all ingredients in powder form being pre-mixed and then fed into the extruder hopper. Table 2 shows the conditions. The extruded mixture was pelletized. Table 3 shows the results.

TABLE 3

Extruder Conditions
All Comparative Examples and Examples

Order of Addition
All ingredients mixed together and
then fed into the extruder hopper.
Examples

|        | B-E, 1, 2 | 3, 4    | 5-9     |
|--------|-----------|---------|---------|
| Zone 1 | 290° C.   | 320° C. | 320° C. |
| Zone 2 | 290° C.   | 310° C. | 310° C. |
| Zone 3 | 300° C.   | 300° C. | 300° C. |
| Zone 4 | 300° C.   | 300° C. | 300° C. |
| Zone 5 | 300° C.   | 300° C. | 300° C. |
| Zone 6 | 300° C.   | 300° C. | 300° C. |
| Zone 7 | 300° C.   | 300° C. | 300° C. |
| Zone 8 | 300° C.   | 300° C. | 300° C. |
| Zone 9 | 300° C.   | 300° C. | 300° C. |
| Die    | 300° C.   | 300° C. | 300° C. |
| RPM    | 250       | 250     | 280° C. |

TABLE 3

|             | Wt. %   |         |         |         |         |         |         |
|-------------|---------|---------|---------|---------|---------|---------|---------|
|             | A       | B       | 1       | 2       | C       | D       | E       |
| PPE         | 100     | 100     | 98.29   | 97.68   | 95.2    | 95      | 90      |
| BPA         |         |         | 0.62    | 1.24    | 3.8     | 4       | 8       |
| DCP         |         |         | 1.09    | 1.09    | 1       | 1       | 2       |
| Total       | 100     | 100     | 100     | 100     | 100     | 100     | 100     |
| Mn          | 28,274  | 38,399  | 11,692  | 17,005  | 30,816  | 38,293  | 30,965  |
| Mw          | 32,332  | 44,937  | 50,623  | 51,075  | 35,680  | 45,430  | 35,536  |
| Mw/Mn       | 1.14    | 1.17    | 4.33    | 3.00    | 1.16    | 1.19    | 1.15    |
| DCP/BPA Ratio | N/A   | N/A     | 1.75    | 0.88    | 0.26    | 0.25    | 0.25    |

|             | Wt. %   |         |         |         |         |         |         |
|-------------|---------|---------|---------|---------|---------|---------|---------|
|             | 3       | 4       | 5       | 6       | 7       | 8       | 9       |
| PPE         | 98.29   | 98.59   | 98.75   | 99.30   | 99.57   | 99.13   | 99.64   |
| BPA         | 0.62    | 0.32    | 0.15    | 0.15    | 0.15    | 0.32    | 0.08    |
| DCP         | 1.09    | 1.09    | 1.10    | 0.55    | 0.28    | 0.55    | 0.28    |
| Total       | 100     | 100     | 100     | 100     | 100     | 100     | 100     |
| Mn          | 10,505  | 11,571  | 12,528  | 12,827  | 13,563  | 11,766  | 15,374  |
| Mw          | 58,517  | 62,117  | 61,816  | 58,932  | 58,386  | 64,336  | 61,056  |
| Mw/Mn       | 5.57    | 5.37    | 4.93    | 4.59    | 4.30    | 5.47    | 3.97    |
| DCP/BPA Ratio | 1.75  | 3.45    | 7.14    | 3.57    | 1.79    | 1.72    | 3.57    |

The unextruded PPE of Comparative Example A was the control. Extruding that PPE as Comparative Example B showed that the number average molecular weight (Mn) increased with an additional heat history for the PPE.

Addition of BPA molecular weight modifier and the DCP redistribution catalyst in Example 1 showed successful chain scission to produce a low molecular weight PPE. The formulation of Example 1 was repeated for Example 3, with very similar results and a demonstration of reproducibility of the process. Doubling the amount of BPA in Example 2 unexpectedly was not as successful in the amount of Mn reduction but was acceptable.

Continuing with an increase in BPA content in Comparative Examples C-E actually and unexpectedly resulted in virtually no change in Mn to the Mn of Comparative Examples A and B. This result was counterintuitive, for more of an ingredient intended to break molecular chains of PPE should make more breakages of those PPE molecular chains. Thus, for reasons not yet fully understood, an amount of BPA ranging from about 0.05% to about 1.5% and preferably from about 0.08% to about 1.25% permits successful chain scission and production of a low molecular weight PPE, all without use of any solvent in the process.

All Examples also had weight average molecular weight (Mw) measured using chloroform as solvent at 25° C. using a Refractive Index Detector and using polystyrene standards according to ASTM D-5296-05. Then, polydispersity (Mw/Mn) was calculated.

From the results in Table 3, the process of the present invention was shown to be capable of producing low molecular weight PPE having a Mn ranging from about 10.000 g/mole to about 30,000 g/mole and preferably from about 10,500 g/mole to about 17,000 g/mole and a polydispersity ranging from about 1.16 to about 6.00 and preferably from about 3.00 to about 5.6, all in the intentional absence of solvents.

Also from the results in Table 3, the ratio of DCP redistribution catalyst and BPA phenolic modifier was studied. It was clear that the ratio of redistribution catalyst to phenolic modifier needs to be greater than 0.3 and preferably greater than 0.8. Examples 4-9 using the same ingredients with the ratios of DCP/BPA of 1.7, 3.4, 3.6, and 7.1 were also successful in reducing the number average molecular weight of the PPE to between about 11,000 and 14,000, with polydispersity of greater than 2 and ranging between 3.9 and 5.5. The invention is not limited to the above embodiments. The claims follow.

What is claimed is:

1. A method of reducing number average molecular weight of a high molecular weight polyphenylene ether polymer from a number average molecular weight of from about 34,000 to about 53,000 grams/mole to a number average molecular weight of from about 10,000 to about 20,000 grams/mole, comprising the steps of:
   (a) introducing the high polymer weight polyphenylene ether polymer, a phenolic modifier, and a redistribution catalyst into the throat of a polymer melt-mixing extruder and (b) propelling the high molecular weight polyphenylene ether polymer, the phenolic modifier, and redistribution catalyst at a sufficient temperature to melt the high molecular weight polymer and for a sufficient duration in the extruder to permit the phenolic modifier to break the high molecular weight polyphenylene ether polymer into a low molecular weight polyphenylene ether having a number average molecular weight of from about 10,000 to about 20,000 grams/mole, wherein no solvent is present in step (a) or step (b), and wherein the low molecular weight polyphenylene ether has a polydispersity (Mw/Mn) of greater than about 2.

2. The method of claim 1, wherein the high polymer weight polyphenylene ether polymer is Poly(2,6-dimethyl-1,4-phenylenether).

3. The method of claim 1, wherein the phenolic modifier is selected from the group consisting of bisphenol A (CAS No. 80-05-7); pentaerythritol tetrakis(3-(3,5-di-tert-butyl-4-hydroxyphenyl)propionate) (CAS No. 6683-19-8); and a bisphenol, other than bisphenol A, having the formula HO-$A^1$-Y-$A^2$-OH, wherein $A^1$ and $A^2$ are independently a monocyclic divalent $C_6$-$C_{16}$ aromatic radical, and Y is a single bond or a $C_1$-$C_{16}$ bridging radical in which one or two atoms separate $A^1$ from $A^2$; and combinations thereof.

4. The method of claim 1, wherein the phenolic modifier comprises any one or more of A) phenolic compounds with formula

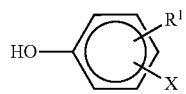

wherein $R^1$ represents a hydrogen-atom or an alkyl group and X represents an allyl group, an amino group, a protected amino group (e.g., protected by a tertiary-butyl carbonate), a carboxyl group, a hydroxy group, an ester group or a thiol group, wherein $R^1$ is an alkyl group when X represents an hydroxy group or an ester group wherein X may be separated from the phenol ring through an alkyl group and wherein the total number of carbon atoms in the alkyl groups attached to the phenol ring is not more than six; wherein X can also be an ether or vinyl group B) bisphenol compounds with formula

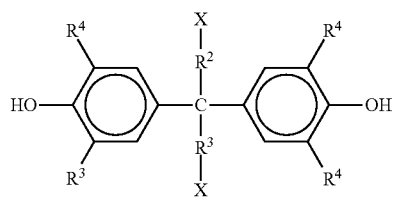

wherein each X, independently of the other X represents a hydrogen atom, an allyl group, an amino group, a protected amino group (e.g., protected by a tertiary-butyl carbonate), a carboxyl group, a hydroxy group, an ester group or a thiol group, with the proviso that not more than one X group represents a hydrogen atom, $R^2$ and $R^3$ represent an hydrogen atom or an alkyl group with 1-6 carbon atoms and each $R^4$ represents independently of the other $R^4$ a hydrogen atom, a methyl group or an ethyl group; wherein R1, R2, R3, R4 can also be independently ether or vinyl C) a phenolic compound with at least one of the formulas:

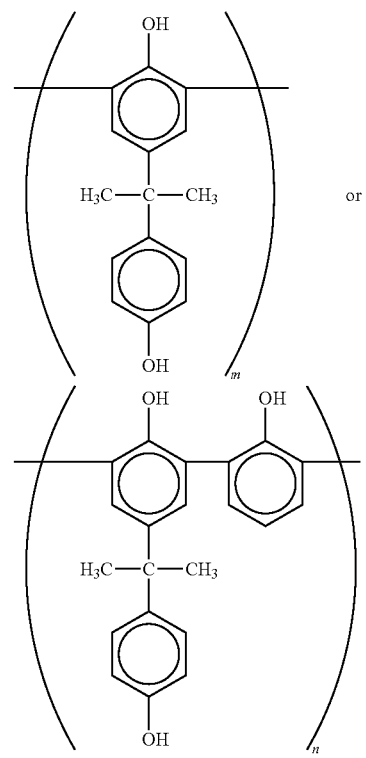

wherein m and n have values from 2-20;

D) phenolic compounds with formula

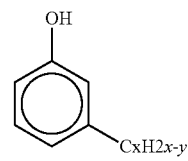

wherein x has a value of 12-20 and y has a value of 1-7 or a derivative thereof; D can also be a monophenol with two such groups attached to the ring;

E) multifunctional phenolic compounds with formula

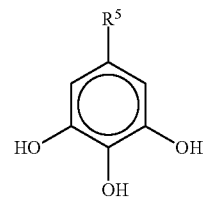

wherein $R^5$ represents a hydrogen atom, an alkyl group, an allyl group, an amino group, a protected amino group (e.g., protected by a tert-butyl carbonate), a carboxyl group, a hydroxy group, an ester group or a thiol group; or F) phenolic compounds with amino groups with formula

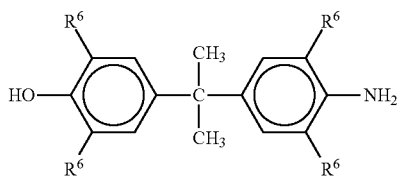

wherein $R^6$ represents independently of one another a hydrogen atom, an alkyl group or a methylene phenol group.

5. The method of claim 1, wherein the redistribution catalyst comprises any one or more of free radical initiators; stable free radical materials; and diphenoquinones.

6. The method of claim 5, wherein the free radical initiator is selected from the group consisting of dicumyl peroxide (CAS No. 000080-43-3); di(2-ethylhexyl) peroxydicarbonate (CAS No. 78-63-7); and combinations thereof.

7. The method of claim 5, wherein the extruder has
(1) a screw diameter ranging from about 11 to about 60 mm;
(2) a number of melt-mixing temperature zones ranging from about 6 to about 28;
(3) temperature in the melt-mixing temperature zones ranging from about 250° C. to about 350° C.;
(4) a length/diameter (L/D) ratio of the extruder ranging from about 25 to about 60; and
(5) a speed in revolutions per minute of the extruder ranging from about 50 to about 600.

8. The method of claim 5, wherein the extruder has
(1) a screw diameter ranging from about 25 to about 53 mm;
(2) a number of melt-mixing temperature zones ranging from about 9 to about 20;
(3) temperature in the melt-mixing temperature zones ranging from about 300° C. to about 325° C.;
(4) a length/diameter (L/D) ratio of the extruder ranging from about 40 to about 60; and
(5) a speed in revolutions per minute of the extruder ranging from about 250 to about 350.

9. The method of claim 8, wherein the extruder further comprises a side feeder or a side-mounted extruder.

10. The method of claim 1, wherein the high polymer weight polyphenylene ether polymer, the phenolic modifier, and the redistribution catalyst are pre-mixed into a homogenous mixture before introduction in step (a) into the throat of a polymer melt-mixing extruder.

11. The method of claim 1, wherein the amount of phenolic modifier can range from about 0.025% to about 10% weight percent and wherein the amount of redistribution catalyst can range from about 0.12% to about 2% weight percent.

12. The method of claim 1, wherein the amount of phenolic modifier can range from about 0.07 to about 1.5% weight percent and wherein the amount of redistribution catalyst can range from about 0.5% to about 1.1% weight percent.

13. The method of claim 1, further comprising step (c) of pelletizing the low molecular weight polyphenylene ether.

14. The method of claim 13, wherein the pelletizing step (c) includes underwater pelletizing.

15. A solvent-less polyphenylene ether having a number average molecular weight of from about 10,000 to about 20,000 grams/mole made according to the method of claim 1 without using any solvents.

16. The method of claim 2, wherein the redistribution catalyst comprises any one or more of free radical initiators; stable free radical materials; and diphenoquinones.

17. The method of claim 2, wherein the amount of phenolic modifier can range from about 0.025% to about 10% weight percent and wherein the amount of redistribution catalyst can range from about 0.12% to about 2% weight percent.

18. The method of claim 2, wherein the amount of phenolic modifier can range from about 0.07 to about 1.5% weight percent and wherein the amount of redistribution catalyst can range from about 0.5% to about 1.1% weight percent.

19. A solvent-less polyphenylene ether having a number average molecular weight of from about 10,000 to about 20,000 grams/mole made according to the method of claim 2 without using any solvents.

20. The method of claim 2, further comprising step (c) of pelletizing the low molecular weight polyphenylene ether.

* * * * *